(12) United States Patent
Shrikhande et al.

(10) Patent No.: US 7,729,477 B2
(45) Date of Patent: Jun. 1, 2010

(54) SYSTEM AND METHOD FOR DETECTING CONTINUITY OF NETWORK LINES

(75) Inventors: Kapil Shrikhande, Berkeley, CA (US); Sam Cauble, San Ramon, CA (US); Stuart L. Blackburn, San Ramon, CA (US); Raghvendra G. Savoor, Walnut Creek, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 839 days.

(21) Appl. No.: 11/357,317

(22) Filed: Feb. 17, 2006

(65) Prior Publication Data

US 2007/0195705 A1  Aug. 23, 2007

(51) Int. Cl.
*H04M 1/24* (2006.01)
(52) U.S. Cl. .................. 379/22; 379/1.04; 375/224
(58) Field of Classification Search ............... 379/1.01, 379/1.03, 1.04, 22–22.04; 370/241, 242; 375/224–231
See application file for complete search history.

(56) References Cited

U.S. PATENT DOCUMENTS

| | | | |
|---|---|---|---|
| 4,022,988 A | 5/1977 | Lentz et al. | |
| 4,149,038 A | 4/1979 | Pitroda et al. | |
| 4,604,745 A | 8/1986 | Takasaki et al. | |
| 5,745,564 A * | 4/1998 | Meek | 379/406.08 |
| 6,389,109 B1* | 5/2002 | Schmidt et al. | 379/1.04 |
| 6,453,016 B1 | 9/2002 | Chea, Jr. | |
| 6,549,570 B1 | 4/2003 | Moden et al. | |
| 6,842,426 B2 | 1/2005 | Bogardus et al. | |
| 6,885,662 B2 | 4/2005 | Gerszberg et al. | |
| 7,593,833 B2* | 9/2009 | Savoor et al. | 702/186 |
| 2003/0179858 A1 | 9/2003 | Bella et al. | |
| 2005/0135566 A1 | 6/2005 | Schmidt et al. | |
| 2005/0141673 A1* | 6/2005 | Lunt et al. | 379/22 |
| 2006/0098725 A1* | 5/2006 | Rhee et al. | 375/222 |
| 2007/0002758 A1* | 1/2007 | Blackburn et al. | 370/252 |

OTHER PUBLICATIONS

International Search Report, International Patent Application No. PCT/US2007/062353, completed Jul. 18, 2007, mailed Apr. 7, 2008, 2 pages.
Written Opinion of the International Searching Authority, International Patent Application No. PCT/US2007/062353, completed Jul. 18, 2007, mailed Apr. 7, 2008, 4 pages.

* cited by examiner

*Primary Examiner*—William Trost, IV
*Assistant Examiner*—Siming Liu
(74) *Attorney, Agent, or Firm*—Jackson Walker L.L.P.

(57) ABSTRACT

The present disclosure provides a system and method for detecting faults related to lines linked to provide network services. The method includes storing a synthetic value for the performance of a line, receiving a measured value of a performance parameter of the line measured at a customer end and comparing the synthetic value with the measured value to determine if a fault condition exists.

20 Claims, 6 Drawing Sheets

SYSTEM AND METHOD FOR DETECTING CONTINUITY OF NETWORK LINES

BACKGROUND OF THE DISCLOSURE

1. Field of the Disclosure

The present disclosure relates generally to communication networks utilizing metallic links for providing services.

2. Description of the Related Art

Service providers provide a variety of services, such as Internet access, Internet Protocol Television (IPTV), Video-on-Demand, Voice over Internet Protocol (VoIP), etc. over networks utilizing wire pairs. In one type of a network, content is transmitted over copper pairs between the service provider's central office or wire center and customer gateways. Typically, a separate wire pair connects a switch, such a Digital Subscriber Line Access Multiplexer, located at the central office to several hundred customer premises, each corresponding to a separate port at the switch. The wire pair typically first terminates at a network interface device located outside the customer premise, from where it may be routed to a connection device, such a telephone jack and then to a customer gateway, such as a Digital Subscriber Line (DSL) modem. DSL transmission typically utilizes differential signaling over the pair of wires. Such two-wire transmission can get impaired if one of the two wires is broken, imperfectly sliced or not connected to the DSL modem. Additionally, errors in wiring can occur at the customer interface and/or at the network end. Sometimes, only one of the two wires may be connected to the modem. In such a case, the DSL modem may be able to establish a circuit, but the quality of the service may be below an acceptable level. Unlike the plain old telephone (POTS) service, DSL line does not need a direct current (DC) path. Thus, a broken conductor may not completely disrupt the DSL service. If a customer does not have a telephone service on the DSL line, such a customer may not notice the lack of dial tone or the presence of crackle, which are indicators of line faults. Often the faults are analyzed utilizing electrical equipment at one or both ends of the line, which can be time-consuming and expensive. Thus, there is a need for an improved system for efficiently determining performance of DSL lines.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals, wherein.

DETAILED DESCRIPTION OF THE EMBODIMENTS

Figure 1:
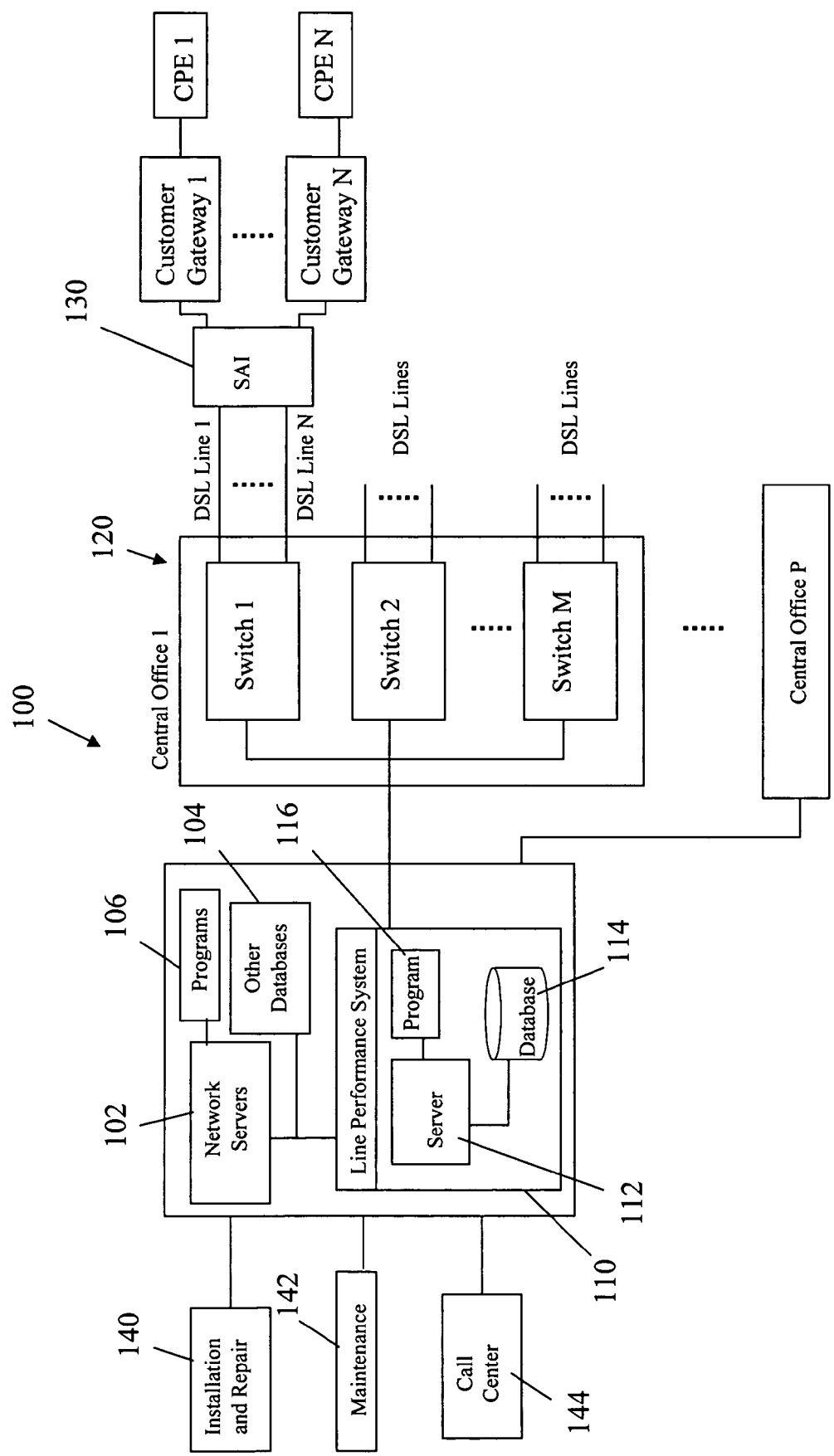
FIG. 1 is a system diagram for determining faults on lines according to one embodiment of the present disclosure.

In view of the above, the present invention through one or more of its various aspects and/or embodiments is presented to provide one or more advantages, such as those noted below.

In one aspect, the present disclosure provides a system, method and computer programs for detecting fault with lines linked to provide network services. In one aspect, the disclosure provides a computer-readable medium accessible to a processor for executing instructions contained in a computer program. The computer programs includes an instruction to store a synthetic value for at least one parameter relating to performance of the line; an instruction to receive over a communications network a measured value of the at least one parameter, measured at a customer end; and an instruction to compare the measured value with the synthetic value to detect fault with the network line. In one aspect, the parameters measured include: upstream attenuation, downstream attenuation, upstream bit rate, and downstream bit rate. In another aspect, the computer program may include an instruction to determine the difference between the measured value and the synthetic value and an instruction to indicate presence of a fault if the difference is outside a selected value. The computer program further may include an instruction to periodically retrieve the measured value from a customer gateway over the communications network. The measured value and the synthetic values correspond to a selected length and gauge of a wire pair. In another aspect a computer program is provided that includes an instruction to compare the measured downstream attenuation with the upstream attenuation and an instruction to indicate a fault condition if the difference between the downstream and upstream attenuations is less than a selected value.

In another aspect, the disclosure provides a method for detecting a fault condition with a line linked to a DSL service that includes: storing a synthetic value for at least one parameter relating to performance of the line; receiving over a communications network a measured value of the at least one parameter, measured at a customer end; comparing the measured value with the synthetic value; and providing an indication of a fault with the line if the difference between the measured value and the synthetic value exceeds a selected amount. The synthetic value may be one of: attenuation value based on a standard; and attenuation measured in a laboratory set up. The method further may periodically retrieve the measured value from a data collection server operatively coupled to retrieve the measured value from a plurality of DSL lines.

In another aspect a system is provided that includes a database that stores a synthetic value for a line linked to a network service; a processor having access to the database and a computer program to execute instructions contained in the computer program. The computer program includes an instruction to receive over the network a measured value of the at least one parameter, over a network measured at a customer end; an instruction to compare the measured value with the synthetic value; and indicating a fault condition with the line if the difference does not meet a selected criterion. The server is linked to switches for retrieving the measured value and to client GUI's for sending messages relating to detected faults.

FIG. 1 shows a functional diagram of a network 100 that includes a system 110 for determining DSL line performance according to one embodiment of the present disclosure. The network 100 is shown to include a number of central offices 120, designated as Central Offices 1-P, each such central office including a plurality of switches. For example, Central Office 1 is shown to include switches 1-M. Central Offices some times also are referred to as "Wire Centers." Central Offices typically provide services to a large number of customers in a geographical area. Each switch, which may be a Digital Service Line Access Multiplexer, is typically connected to 500-1000 customer premise devices via a separate line for each premise, which may be a twisted copper pair. Thus, a Central Office may serve several thousand customers in a neighborhood or a selected geographical area. In the example of system 100, switch 1 is shown coupled to Customer Gateway 1 through Customer Gateway N via separate lines designated as DSL Lines 1-N. Each customer gateway is further shown connected to a customer premise equipment (such as CPE 1-CPE N), which may include computers, set top boxes connected to television sets, etc. The customer gateway typically may be a DSL modem, accessible to the associated switch. A Service Area Interface (SAI) 130 may be utilized between the switch and multiple neighboring customer gateways. The switch may include processors and other circuitry for two way communications between the switch and the associated customer gateways. The switch acts as a buffer between a backbone network (not shown) for providing the DSL services to the customers.

In one aspect, the customer gateway includes one or more processors and programs that measure values of certain selected performance parameters of the associated DSL line. The parameters measured may include, but are not limited to, upstream bit rate, downstream bit rate, upstream attenuation (e.g., loss in dB), and downstream attenuation. The measurements may be made according to programmed instructions provided to the customer gateway or on commands sent from the network via the switch. The customer gateway may store the measured data in a storage medium associated with the customer gateway, such as Read-Only Memory (ROM), Random Access Memory (RAM), flash memory, etc. The term "upstream" means looking from or information transfer from the customer gateway end to the network, while the term "downstream" means looking from or information transfer from the network end to the customer gateway. In one aspect, the switches may periodically retrieve the measurement data from the customer gateway and provide the same to network servers, such as servers 102, which have associated database 104 and computer programs 106. In another aspect, the DSL modems may send the measurements to their associated switches. In another aspect, the servers may query the switches for the measurements made at the customer gateways.

Still referring to FIG. 1, the system 100 further is shown to include a Line Performance System that includes one or more servers, such server 112, a database 114 and computer programs 116 stored or embedded in computer-readable media accessible to the server 112. The database 104 and/or database 114 may store information relating to each customer. Such information may include: identity of the customer, such as an identifier associated with the customers, which may include a telephone number associated with the line, serial number of the customer gateway; loop length of the line; service provided to the customer, including upstream and downstream data transfer rates subscribed by the customer; historical measured values of any of the parameters; wire gauge; loop length of the line; etc. The databases also store synthetic or theoretical values of selected performance parameters as described below.

Figure 2:
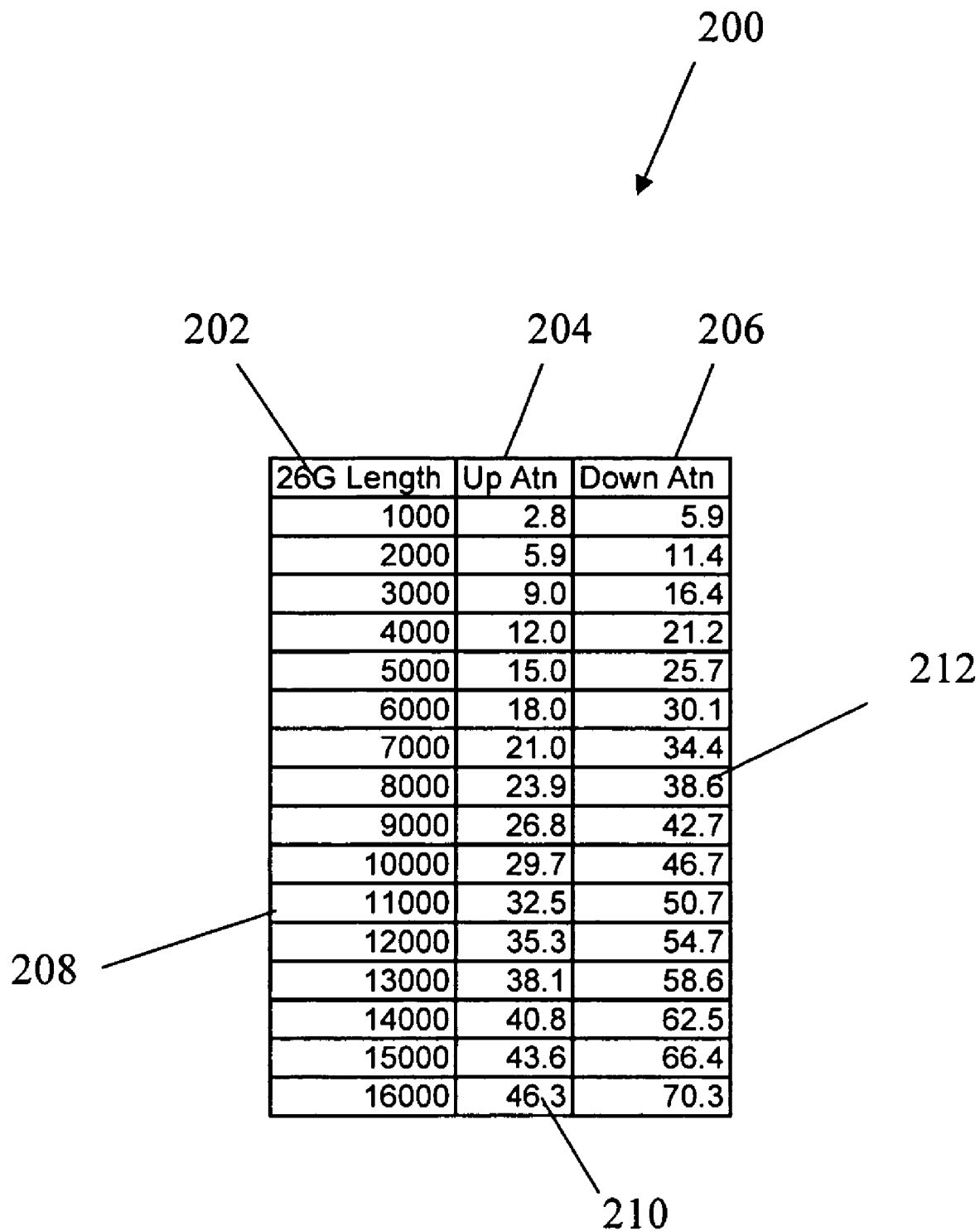
FIG. 2 shows a table of theoretical expected upstream and downstream loop attenuation values for a selected gauge of wire utilized for providing DSL services.

FIG. 2 shows a table 200 that depicts an example of synthetic or theoretical values. The table 200 shows synthetic upstream attenuation values 204 and downstream attenuation values 206 for different lengths of a 26 gauge (26 g) copper wire pair. Column 208 shows the length, while columns 210 and 212 show the upstream and downstream attenuations respectively. The particular values shown are in decibels and correspond to an industry standard only as an illustration and not as any limitation respecting the types of values that may be utilized for the purpose of this disclosure. Thus, the synthetic values may be any desired values, including measurements made in a laboratory, derived from historical values, values set based on a business rule, values derived using an algorithm, etc. In a typical network, upstream measurements are made at lower frequencies than the downstream measurements. Attenuation is greater at higher frequencies. Thus, as shown in FIG. 2, the upstream attenuation values shown are lower than the downstream values for the same gauge and length of the copper wire. It is common to make the upstream attenuation measurements from 25 KHz to 138 KHz and the downstream measurements from 14 KHz to 1.1 MHz.

Figure 3:
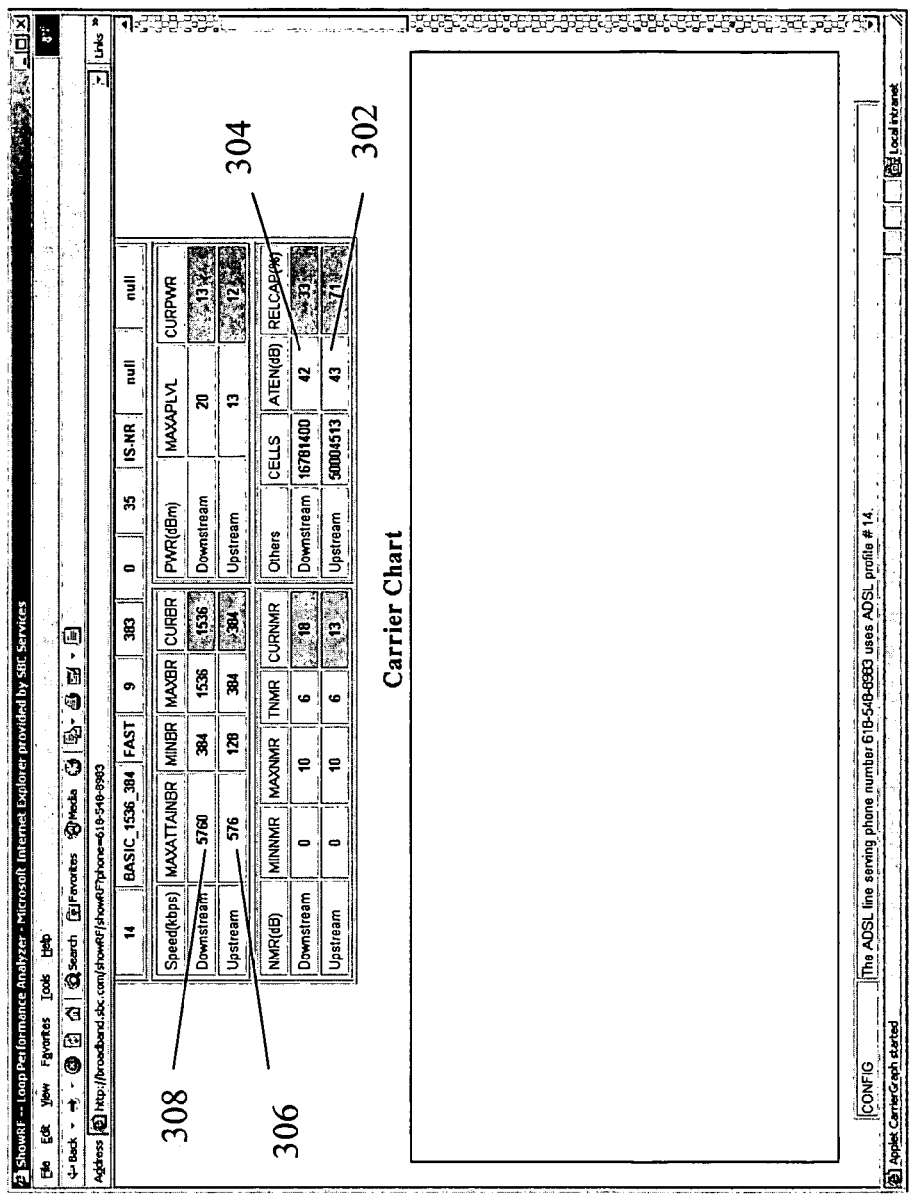
FIG. 3 shows an exemplary screenshot depicting measured parameters for a defective line according to one aspect of the present disclosure.

Tests have shown that a broken wire in the pair in a DSL transmission path can result in (i) higher values for upstream and downstream attenuation compared to a normal wire pair; and (ii) upstream attenuation can be greater than the downstream attenuation. Similarly, attenuation measurements obtained from field-deployed DSL modems have been found to exhibit such patterns in loop attenuation. FIG. 3 shows a screen shot for a DSL line from a field-deployed modem. It shows that the upstream attenuation of 43 dB (block 302) is greater than the downstream attenuation of 42 dB (block 304) compared to a neighboring line with upstream attenuation of 15 and downstream attenuation of 24, as shown in the screen shot 400 depicted in FIG. 4 (see blocks 402 and 404 respectively). Also, the attainable bit rate in the line corresponding to FIG. 3 is affected in both the upstream and downstream directions compared to the neighboring line shown in FIG. 4. The attainable bit rates in FIG. 3 are shown to be 576 kb for upstream (block 306) compared to 1088 kb in FIG. 4 (block 406) and the downstream attainable bit rates are shown to be 5760 kb (block 308) compared to 8128 (block 408).

Figure 4:
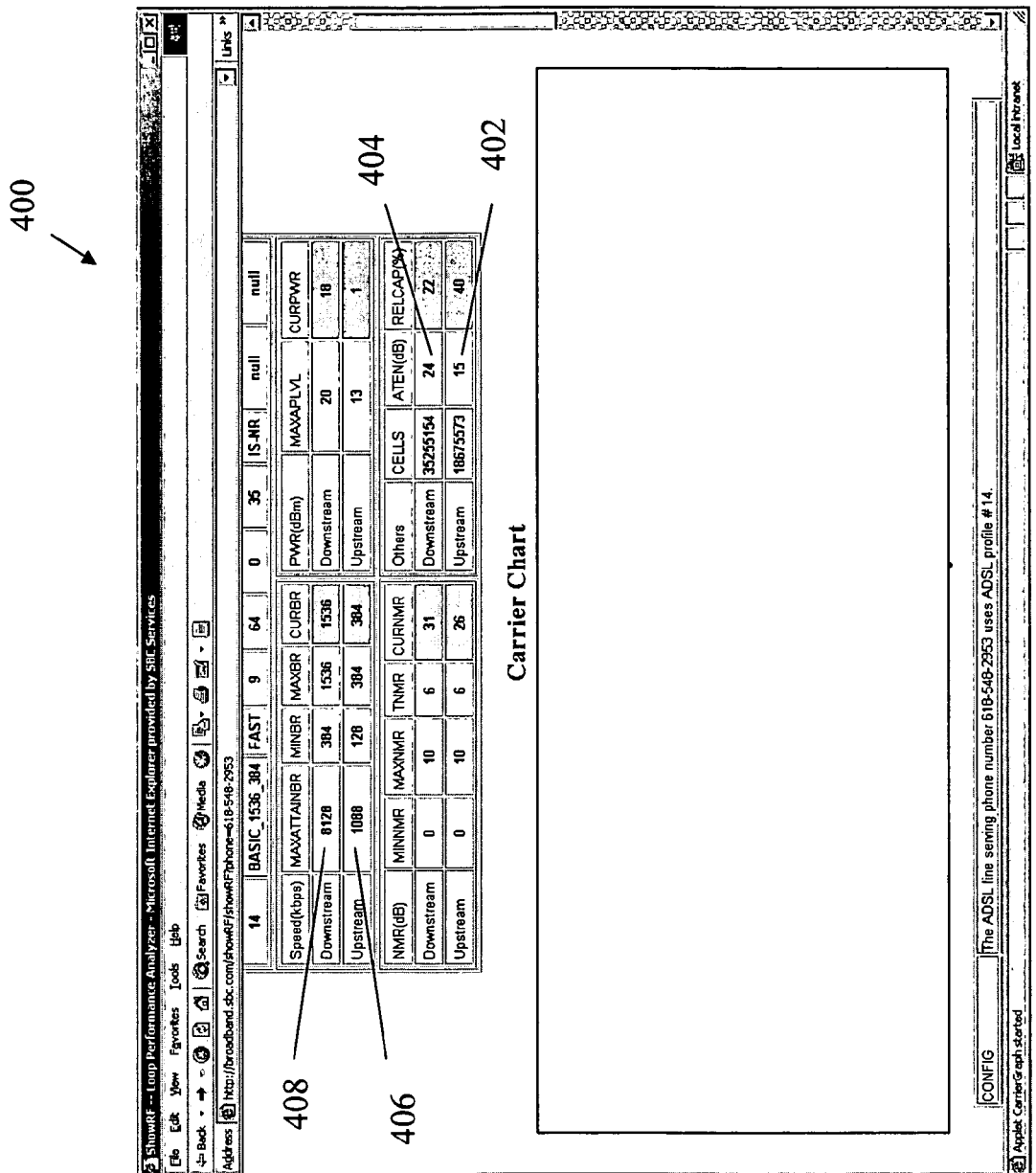
FIG. 4 shows an exemplary screenshot depicting measured parameters for a neighboring normal line according to one aspect of the present disclosure.

Referring back to FIG. 1, the server 112, in one aspect, receives the line performance measurements made at the customer ends and compares or correlates the received measurements with stored synthetic values. If a measured value falls outside a benchmark or does not meet a selected criterion, the server may send an indication of a line problem. The fault indication may be sent in the form of the exemplary screen shot of FIG. 3. In another aspect, the server may be provided with programs that include instructions for the server to determine if the measured value meets a selected or predetermined criterion. The server may also determine that the measured value is outside a limit or that the upstream attenuation compares unfavorably with the downstream attenuation of the line or that the discrepancy in the attainable bit rate is greater than a threshold or that the measured value does not meet a business rule, such as a set minimum performance level value. As noted earlier, the measurements may be obtained by any other server, such as server 102 and stored in any database, such as database 104. The Line Performance System server 102 may retrieve the necessary line performance measurements and other desired network information from any database in the network. The server further may send a message or a report, such as shown in FIGS. 3 and 4 for display on a Customer Graphical Interface, to a Call Center 144 of the service provider that may receive a query from an affected customer, an Installation and Repair facility 140 that may take a corrective action, such as repairing or replacing the affected line, and/or to a maintenance facility 142.

Figure 5:
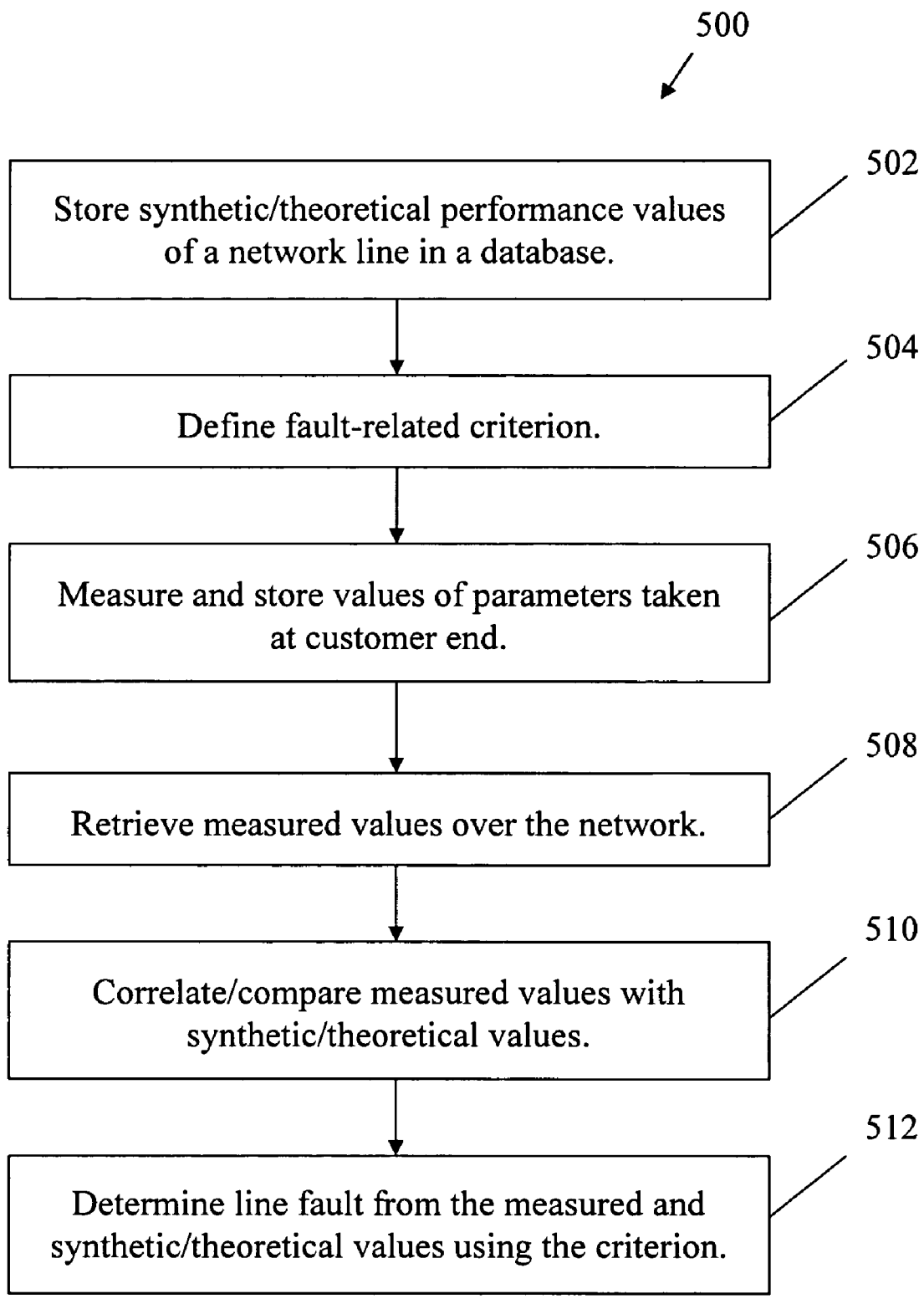
FIG. 5 shows a flowchart depicting a method performed according to one embodiment of the present disclosure.

FIG. 5 shows a flow chart of an exemplary method 500 according to one aspect of the present disclosure. As shown in block 502, synthetic or theoretical values of performance parameters of network lines are stored in a database. One or more fault-related criteria are set or defined, as shown in block 504. Values of measurements made at the customer end are stored at the customer gateway and/or a network database (block 506). The measured values are then retrieved (block 508) over the network. The system compares or correlates the measured values with the synthetic values (block 510) and determines line faults from the measured and synthetic values using the criteria. The selected criterion may be one of: the measured value is outside a norm; the measured value is below a minimum value (for example the attainable bit rate is below a minimum number); and the measured value is above a maximum value (for example the attenuation is above a maximum number).

Figure 6:
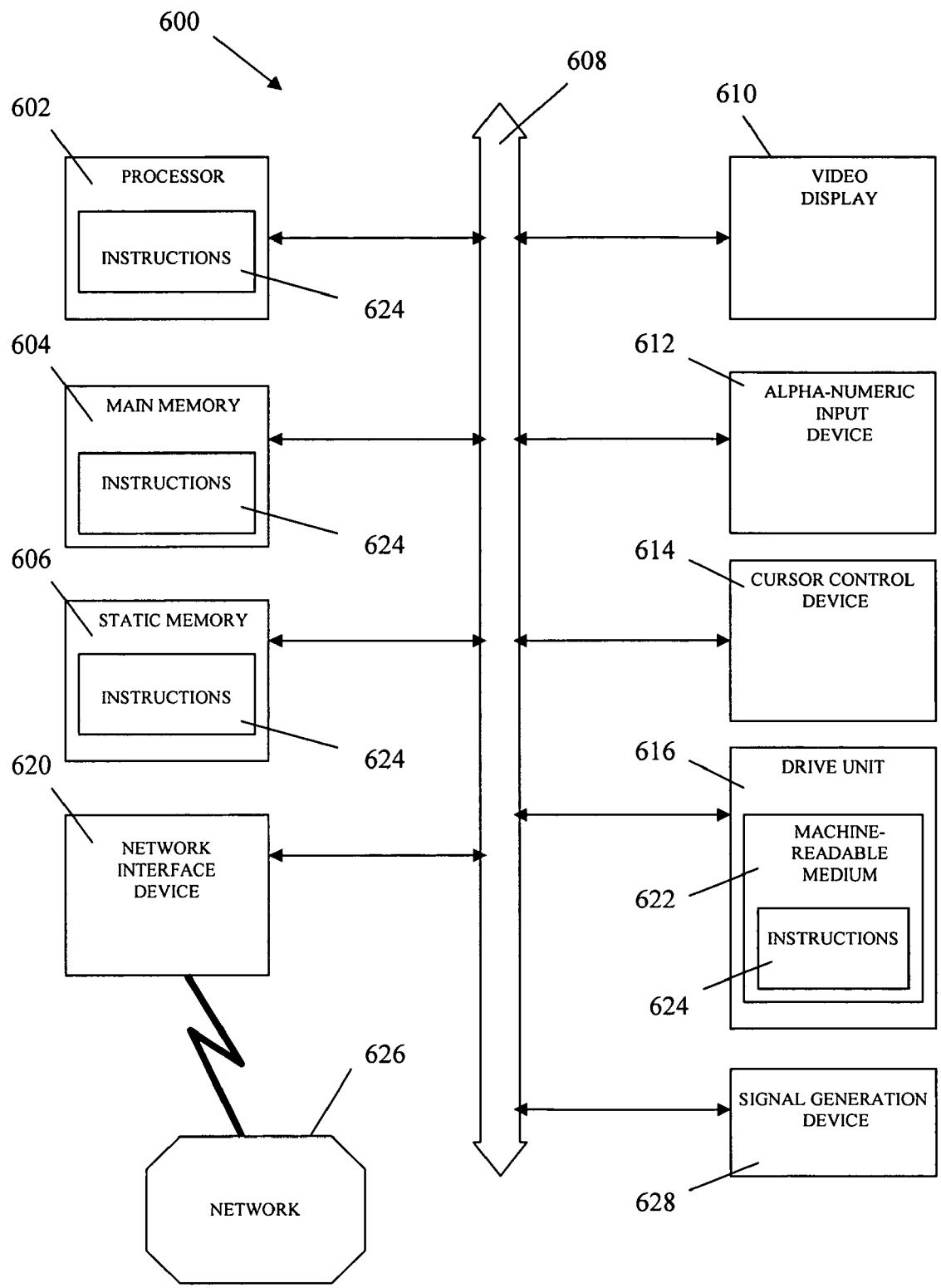
FIG. 6 is a diagrammatic representation of a machine in the form of a computer system within which a set of instructions, when executed, may cause the machine to perform any one or more of the methodologies discussed herein.

The methods and the computer programs described herein, including receiving the performance measurements, determining if one or more measurements do not meet a selected criterion may be implemented by a computer system, such as an exemplary system shown in FIG. 6, which is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a landline telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 650 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A tangible computer readable storage medium including instructions for detecting a fault condition in a DSL transmission path, the instructions embedded in the computer readable storage medium, the instructions comprising instructions to:

receive from a customer gateway a measured value for upstream attenuation of the DSL transmission path and a measured value for downstream attenuation of the DSL transmission path, connected to the customer gateway and to a switch, the switch being connected to a plurality of other customer gateways, that provides a network service, wherein the upstream attenuation is indicative of attenuation of a signal transmitted from the customer gateway to the switch and wherein the downstream attenuation is indicative of attenuation of a signal transmitted from the switch to the customer gateway; and send an indication of a fault condition for the line if the difference between the downstream attenuation and upstream attenuation is less than a selected value.

2. The computer readable storage medium of claim 1, further comprising instructions to:
retrieve from the customer gateway an upstream bit rate value and a downstream bit rate value.

3. The computer readable storage medium of claim 2, further comprising instructions to:
compare at least one of the retrieved values to a respective theoretical value.

4. The computer readable storage medium of claim 3, further comprising instructions to:
indicate a fault if a difference between the at least one retrieved value and the respective theoretical value exceeds a selected value.

5. The computer readable storage medium of claim 2, wherein the retrieved values and the theoretical values correspond to a selected length and gauge of a wire pair.

6. The computer readable storage medium of claim 1, further comprising instructions to:
periodically retrieve the upstream and downstream attenuation values from the customer gateway.

7. The tangible computer readable storage medium of claim 1, wherein the customer gateway comprises a digital subscriber line (DSL) modem, the switch comprises a DSL access multiplexer (DSLAM), and the network service comprises a DSL service.

8. A method of determining a fault condition for a DSL line, connected to the customer gateway and to a switch, the switch being connected to a plurality of other customer gateways, the line being used for providing a network service, comprising:
retrieving over a network from a customer gateway an upstream attenuation value and downstream attenuation value for the DSL line, wherein the upstream attenuation is indicative of attenuation of a signal transmitted from the customer gateway to the switch and wherein the downstream attenuation is indicative of attenuation of a signal transmitted from the switch to the customer gateway; and
indicating a fault condition for the line when the downstream attenuation value does not exceed the upstream attenuation value by at least a specified threshold difference.

9. The method of claim 8, further comprising:
retrieving from the customer gateway an upstream bit rate value and a downstream bit rate value.

10. The method of claim 9, further comprising:
comparing at least one of the retrieved values to a respective theoretical value.

11. The method of claim 10, further comprising:
indicating a fault if a difference between the at least one retrieved value and the respective theoretical value exceeds a selected value.

12. The method of claim 9, wherein the retrieved values and the theoretical values correspond to a selected length and gauge of a wire pair.

13. The method of claim 8, further comprising:
periodically retrieve the upstream and downstream attenuation values from the customer gateway.

14. The method of claim 8, wherein the customer gateway comprises a digital subscriber line (DSL) modem, the switch comprises a DSL access multiplexer (DSLAM), and the network service comprises a DSL service.

15. A data processing system including a processor and memory, said memory including processor executable instructions for determining a fault condition for a DSL line, connected to the customer gateway and to a switch, the switch being connected to a plurality of other customer gateways, the line being used for providing a network service, the instructions comprising instructions to:

retrieve from a customer gateway an upstream attenuation value and downstream attenuation value for the DSL line, wherein the upstream attenuation is indicative of attenuation of a signal transmitted from the customer gateway to the switch and wherein the downstream attenuation is indicative of attenuation of a signal transmitted from the switch to the customer gateway; and indicate a fault condition for the line if the downstream attenuation value exceeds the upstream attenuation value by less than a threshold value.

16. The data processing system of claim 15, further comprising instructions to:

retrieve from the customer gateway an upstream bit rate value and a downstream bit rate value.

17. The data processing system of claim 16, further comprising instructions to:

compare at least one of the retrieved values to a respective theoretical value.

18. The data processing system of claim 17, further comprising instructions to:

indicate a fault if a difference between the at least one retrieved value and the respective theoretical value exceeds a selected value.

19. The data processing system of claim 16, wherein the retrieved values and the theoretical values correspond to a selected length and gauge of a wire pair.

20. The data processing system of claim 15, further comprising instructions to:

periodically retrieve the upstream and downstream attenuation values from the customer gateway.

* * * * *